Nov. 1, 1955 P. C. BARTON 2,722,440
COUPLINGS OR FASTENINGS FOR SCAFFOLDING AND LIKE POLES
Filed March 17, 1950
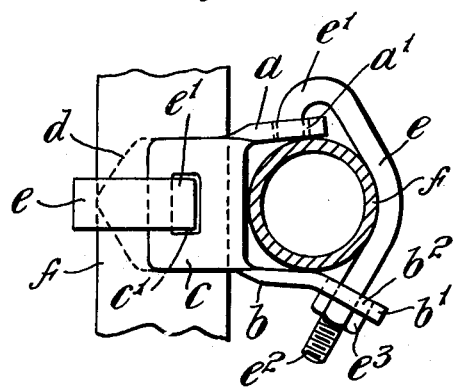
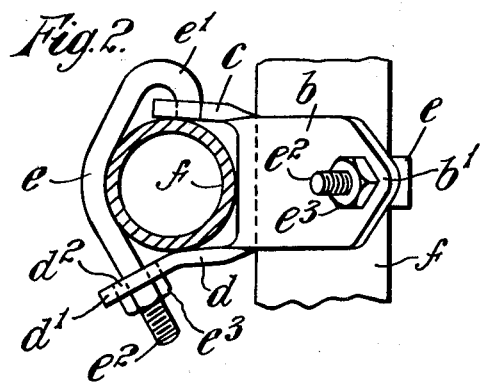
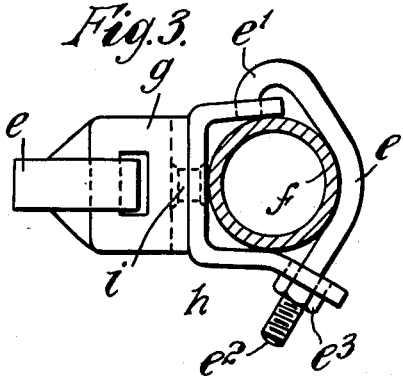
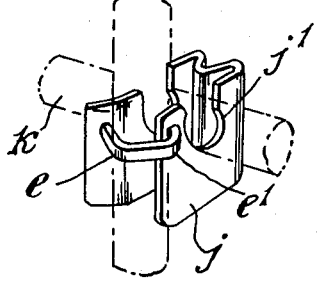
INVENTOR
PERCY CHARLES BARTON
BY Henninger & Allen
ATTORNEYS

United States Patent Office 2,722,440
Patented Nov. 1, 1955

2,722,440

COUPLINGS OR FASTENINGS FOR SCAFFOLDING AND LIKE POLES

Percy Charles Barton, Birmingham, England

Application March 17, 1950, Serial No. 150,116

3 Claims. (Cl. 287—54)

The present invention has reference to couplings or fastenings for scaffolding and like poles, and has for its object to provide such a device of simple construction and which is cheap to produce and at the same time particularly satisfactory and efficient in use.

According to the present invention there is provided a fastening for a scaffolding or like pole comprising a two limbed socket between the limbs of which the pole may be placed and maintained by virtue of a curved bolt one extremity of which is of inturned hook-like formation adapted to be engaged with a slot in one limb of the socket by an approach from its outer face, the stem of the bolt being passed through a closed or open-sided slot in the other limb of the socket and secured by a nut.

Advantageously two outwardly facing U-shaped sockets are employed connected integrally in planes at right angles for the right angle reception of two poles, or alternatively two sockets may be operatively connected by a swivel engaging their yokes for adjustment purposes.

In order that this invention may be clearly understood and readily carried into practice reference may be had to the appended drawings, in which:

Fig. 1 illustrates in elevation a coupling or fastening constructed according to the present invention.

Fig. 2 is an inverted plan view of the coupling or fastening shown in Fig. 1.

Figs. 3 and 4 illustrate modified couplings hereafter referred to.

In a convenient embodiment of the present invention the body of the device is stamped up or formed from a pressing of heavy gauge metal having four arms. The arms of this blank are bent outwardly in opposite directions to constitute two open sockets $ab$ and $cd$ disposed at right angles one to the other and into these sockets the tubes or poles are placed with a snug or wedge fit. The two arms $ab$ or $c$ and $d$ may be disposed in substantially parallel relation or perhaps slightly diverging apart (see Figures 1 and 2) and the one arm $b$ and $d$ of each pair is provided with an integral extension $b^1$ $d^1$, which is bent outwardly in oblique manner at an angle of say substantially 135° to the lower part of the arm, and this bent part is provided with an elongated closed slot $b^2d^2$. The shorter arm is provided with an oblong slot $a$, $c^1$, the said arm being a more or less rectangular or oblong member open at its centre part only. The bolt or strap $e$ in this invention is of stout flat section metal and comprises a centrally positioned curved body section which merges into a more or less flat or straight part or section which terminates in an inwardly facing or inturned hook formation $e^1$, and the remote extremity of the bolt or strap is in the form of an integral shank $e^2$ which is screw-threaded and provided with a nut $e^3$. When the bolt or strap $e$ is in position the inturned hook formation $e^1$ is engaged with the slot $a^1$ $c^1$ in the short limb $a$ or $c$ of the hocket and the shank $e^2$ of the strap $e$ extends from the curved body section by a generally straight part which section is projected through the closed slot $b^2d^2$ in the longer limb $b$ or $d$ as shown in Figs. 1 to 3, inclusive. In order to secure the pole $f$ the same is firstly placed in the socket $ab$ or $cd$ formed by the two limbs and the bolt $e$ with its shank already loosely engaged with the longer limb $b$ or $d$ is manipulated so that the inturned hook formation $e^1$ is caused to approach the slotted limb $a$ or $c$ from the outer face thereof until such time as the hook is fully engaged with the slot. The tightening of the nut $e^3$ naturally forces the bolt $e$ down onto the pole and clamps the latter effectively between the limbs. The terminal extremity $e^4$ of the bolt is of such a length that it impinges upon the pole $f$ to assits in securing the pole in its socket.

In the embodiment shown in Fig. 3 the two clamps $g$ and $h$ are connected by a swivel pin $i$ and in the embodiment shown in Fig. 4 a U-shaped plate $j$ is provided with a slot $j^1$ for a cross pole $k$ of a distance piece the bolt $e$ being utilised with the hook-shaped extremity $e^1$ as hereinbefore. In its simplest form a socket $ab$ may carry a spike for engaging a wooden fixture or the said socket $ab$ may be carried by a pedestal adapted to rest upon the ground for the support of a pole in an upright or horizontal position, the present invention residing in the fastening or clip $abe$ for securing the pole per se as hereinafter more particularly claimed.

I claim:

1. A fastening device for a scaffolding or like pole comprising in combination, a pole-receiving socket member provided with a first arm and a second arm, which arms are positioned in spaced approximately parallel relation, a first slot in said first arm, a second slot in said second arm, a strap curved in the middle portion thereof adapted to conform to and bindingly engage a pole received by said socket member, said strap having a threaded section adjacent to one end thereof and an inturned hook head on the other end thereof, said threaded section being spaced from said curved middle portion by a straight section, and said inturned hook head being spaced from said curved middle portion by a straight section, said inturned hook head of said strap engaged in said first slot with the terminal extremity surface of said hook positioned in an impinging and frictionally binding relation with respect to the surface of a pole received by said socket member, the end of said strap bearing said threaded section engaged in and passing through said second slot, and a nut cooperating with said threaded section to secure said strap in position.

2. A fastening device for a scaffolding or like pole as defined in claim 1 wherein said second arm is provided with an integral extension extending obliquely outwardly in which extension said second slot is located.

3. A fastening device for coupling a pair of poles positioned at substantially right angles to each other comprising in combination, a first pole-receiving socket member provided with a first arm and a second arm, which arms are positioned in spaced approximately parallel relation, a first slot in said first arm, a second slot in said second arm, a first strap curved in the middle portion thereof adapted to conform to and bindingly engage a pole received by said socket member, said strap having a threaded section adjacent to one end thereof and an inturned hook head on the other end thereof, said threaded section being spaced from said curved middle portion by a straight section, and said inturned hook head being spaced from said curved middle portion by a straight section, said inturned hook head of said strap engaged in said first slot with the terminal extremity surface of said hook positioned in an impinging and frictionally binding relation with respect to the surface of a pole received by said socket member, the end of said strap bearing said threaded section engaged in and passing through said second slot, a nut cooperating with said threaded section to secure said strap in position, a second socket member substantially identical with said first socket member and joined thereto at right angles, and a second curved strap substantially identical with said first curved strap engaged with said second socket member.

References Cited in the file of this patent

UNITED STATES PATENTS

| | | |
|---|---|---|
| 2,358,580 | Leonard | Sept. 19, 1944 |
| 2,511,035 | Barton | June 13, 1950 |

FOREIGN PATENTS

| | | |
|---|---|---|
| 340,337 | Italy | May 11, 1936 |
| 489,786 | Great Britain | Aug. 4, 1938 |